United States Patent
Krzywon et al.

(10) Patent No.: US 12,466,545 B2
(45) Date of Patent: Nov. 11, 2025

(54) SYSTEMS AND METHODS FOR CONTROLLING PROPELLER CONTROL UNIT FLUID PRESSURE

(71) Applicant: Pratt & Whitney Canada Corp., Longueuil (CA)

(72) Inventors: Jagoda Krzywon, Longueuil (CA); Benoit Lachance, Varennes (CA); James Jarvo, Long Sault (CA)

(73) Assignee: PRATT & WHITNEY CANADA CORP., Longueil (CA)

( * ) Notice: Subject to any disclaimer, the term of this patent is extended or adjusted under 35 U.S.C. 154(b) by 107 days.

(21) Appl. No.: 17/982,675

(22) Filed: Nov. 8, 2022

(65) Prior Publication Data
US 2024/0150010 A1 May 9, 2024

(51) Int. Cl.
*B64C 11/42* (2006.01)
*B64C 11/38* (2006.01)
*F15B 13/02* (2006.01)

(52) U.S. Cl.
CPC .............. *B64C 11/42* (2013.01); *B64C 11/38* (2013.01); *F15B 13/024* (2013.01)

(58) Field of Classification Search
CPC .... B64C 11/38; B64C 11/42; F15B 2211/251; F15B 2211/252; F15B 2211/55
See application file for complete search history.

(56) References Cited

U.S. PATENT DOCUMENTS

| | | | | |
|---|---|---|---|---|
| 4,711,615 | A * | 12/1987 | Rusu | B64C 11/40 416/154 |
| 8,413,677 | B1 * | 4/2013 | Coffman | F15B 13/024 137/488 |
| 8,573,927 | B2 * | 11/2013 | Swift | B64C 11/308 416/157 R |
| 10,501,169 | B2 * | 12/2019 | Waddleton | F04D 29/582 |
| 10,745,111 | B2 * | 8/2020 | Lassalle | F15B 5/006 |
| 11,059,567 | B2 * | 7/2021 | Des Roches-Dionne | B64C 11/30 |

(Continued)

FOREIGN PATENT DOCUMENTS

CN 112211862 A * 1/2021

OTHER PUBLICATIONS

EP Search Report for EP Patent Application No. 23208595.1 dated Apr. 12, 2024.

*Primary Examiner* — Brian P Wolcott
(74) *Attorney, Agent, or Firm* — Getz Balich LLC

(57) ABSTRACT

A propeller control unit for an aircraft propulsion system including a propeller is provided. The propeller control unit includes an actuator, a pump, a flow regulator, a pressure sensor, and a controller. The actuator is configured to control a pitch of each of the propeller blades. The pump is configured to direct hydraulic fluid to the actuator. The flow regulator is in fluid communication with the pump and configured to control a hydraulic fluid pressure of the hydraulic fluid downstream of the pump. The pressure sensor is disposed downstream of the pump and upstream of the actuator. The pressure sensor is configured to measure the hydraulic fluid pressure and generate a hydraulic fluid pressure signal. The controller includes a processor in communication with a non-transitory memory storing instructions, which instructions when executed by the processor, cause the processor to monitor the hydraulic fluid pressure signal.

6 Claims, 6 Drawing Sheets

(56) References Cited

U.S. PATENT DOCUMENTS

| | | | |
|---|---|---|---|
| 11,097,832 B2* | 8/2021 | Maver | B64C 11/38 |
| 11,519,346 B2* | 12/2022 | Cervelli | F02C 9/58 |
| 2017/0267329 A1 | 9/2017 | Lassalle | |
| 2017/0361919 A1 | 12/2017 | Waddleton | |
| 2019/0031319 A1* | 1/2019 | Calkins | B64C 11/40 |
| 2020/0298959 A1* | 9/2020 | Castellani | F01D 5/021 |
| 2021/0164403 A1* | 6/2021 | Krzywon | B64C 11/38 |

* cited by examiner

SYSTEMS AND METHODS FOR CONTROLLING PROPELLER CONTROL UNIT FLUID PRESSURE

TECHNICAL FIELD

This disclosure relates generally to propeller control units for aircraft propulsion systems and, more particularly, to systems and methods for controlling hydraulic fluid pressure for propeller control units.

BACKGROUND OF THE ART

Some propulsion systems for aircraft may include propellers having variable-pitch propeller blades. Various systems and methods are known in the art for controlling propeller blade pitch. For example, propeller blades may be rotated or otherwise operated using hydraulic control systems and methods. While these known hydraulic control systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propeller control unit for an aircraft propulsion system including a propeller is provided. The propeller control unit includes an actuator, a pump, a flow regulator, a pressure sensor, and a controller. The actuator is configured to rotate propeller blades of the propeller to control a pitch of each of the propeller blades. The pump is configured to direct hydraulic fluid to the actuator. The flow regulator is in fluid communication with the pump. The flow regulator is configured to control a hydraulic fluid pressure of the hydraulic fluid downstream of the pump. The pressure sensor is in fluid communication with the pump. The pressure sensor is disposed downstream of the pump and upstream of the actuator. The pressure sensor is configured to measure the hydraulic fluid pressure and generate a hydraulic fluid pressure signal. The controller is in signal communication with the pressure sensor. The controller includes a processor in communication with a non-transitory memory storing instructions, which instructions when executed by the processor, cause the processor to monitor the hydraulic fluid pressure signal from the pressure sensor.

In any of the aspects or embodiments described above and herein, the instructions, when executed by the processor, may further cause the processor to identify an over-pressure condition is present or absent based on a pressure range for the hydraulic fluid pressure signal.

In any of the aspects or embodiments described above and herein, the hydraulic fluid may be oil.

In any of the aspects or embodiments described above and herein, the instructions, when executed by the processor, may further cause the processor to generate a notification based on identification the over-pressure condition is present.

In any of the aspects or embodiments described above and herein, the propeller control unit may further include an auxiliary relief valve and a servo valve, the auxiliary relief valve and the servo valve in fluid communication with the pump. Each of the servo valve, the pump, the flow regulator, and the auxiliary relief valve may bound a main hydraulic fluid flow path of the propeller control unit. The pressure sensor may be in fluid communication with the main hydraulic fluid flow path. The auxiliary relief valve may be configured to control the hydraulic fluid pressure in the main hydraulic fluid flow path independent of the flow regulator.

In any of the aspects or embodiments described above and herein, the instructions, when executed by the processor, may further cause the processor to open the auxiliary relief valve when the hydraulic fluid pressure signal exceeds a hydraulic fluid pressure threshold.

In any of the aspects or embodiments described above and herein, the instructions, when executed by the processor, may further cause the processor to identify a degraded operational condition of the flow regulator based on the hydraulic fluid pressure signal.

In any of the aspects or embodiments described above and herein, the instructions, when executed by the processor, may further cause the processor to identify the degraded operational condition based on identification of an over-pressure condition of the hydraulic fluid pressure signal which occurs for an amount of time exceeding a time threshold.

In any of the aspects or embodiments described above and herein, the flow regulator may include a spring-biased pressure relief valve.

In any of the aspects or embodiments described above and herein, each of the auxiliary relief valve and the flow regulator may be configured to direct the hydraulic fluid from the main hydraulic fluid flow path to an inlet of the pump.

According to another aspect of the present disclosure, a method for controlling hydraulic fluid pressure for a propeller control unit of an aircraft propulsion system is provided. The method includes: directing hydraulic fluid to an actuator of the propeller control unit, measuring a hydraulic fluid pressure of the hydraulic fluid directed to the actuator, controlling the hydraulic fluid pressure with a flow regulator by selectively directing the hydraulic fluid into a leakage flow path with the flow regulator, and monitoring the hydraulic fluid pressure to identify that an over-pressure condition is present or absent for the hydraulic fluid pressure based on a predetermined pressure range for the hydraulic fluid pressure.

In any of the aspects or embodiments described above and herein, the flow regulator may include a spring-biased pressure relief valve and the step of controlling the hydraulic fluid pressure may include selectively directing the hydraulic fluid into the leakage flow path with the spring-biased pressure relief valve. The step of controlling the hydraulic fluid pressure may further include selectively operating an auxiliary relief valve in fluid communication with the leakage flow path.

In any of the aspects or embodiments described above and herein, the aircraft propulsion system may include a propeller including a plurality of propeller blades and the method may further include controlling a pitch of each propeller blade of the plurality of propeller blades with the actuator.

In any of the aspects or embodiments described above and herein, the method may further include feathering each propeller blade of the plurality of propeller blades based on the monitored hydraulic fluid pressure.

According to another aspect of the present disclosure, an aircraft propulsion system includes a propeller and an oil system. The propeller includes a plurality of variable-pitch propeller blades. The oil system includes an oil supply assembly, an oil return assembly, and a propeller control unit. The propeller control unit is in fluid communication with the oil supply assembly and the oil return assembly. The propeller control unit includes an actuator, a fixed-displacement pump, a flow regulator, and an auxiliary relief valve. The actuator is configured to control a pitch of each of the variable-pitch propeller blades. The fixed-displacement pump is configured to draw oil from the oil supply assembly and direct the oil to the actuator. The flow regulator is in fluid communication with the pump. The flow regulator includes a spring-biased pressure relief valve configured to control an oil pressure of the oil downstream of the pump by selectively directing the oil to the oil return assembly. The auxiliary relief valve is in fluid communication with the pump. The auxiliary relief valve is remotely actuatable to an open position and a closed position. The auxiliary relief valve in the open position is configured to direct the oil to the oil return assembly.

In any of the aspects or embodiments described above and herein, the auxiliary relief valve may be configured as a solenoid valve.

In any of the aspects or embodiments described above and herein, the propeller control unit may further include a pressure sensor and the aircraft propulsion system may further include a controller. The pressure sensor may be in fluid communication with the pump. The pressure sensor may be disposed downstream of the pump and upstream of the actuator. The pressure sensor may be configured to measure the oil pressure and generate an oil pressure signal. The controller may be in signal communication with the pressure sensor and the auxiliary relief valve.

In any of the aspects or embodiments described above and herein, the controller may include a processor in communication with a non-transitory memory storing instructions, which instructions when executed by the processor, may cause the processor to remotely actuate the auxiliary relief valve based on the oil pressure signal.

In any of the aspects or embodiments described above and herein, the controller may include a processor in communication with a non-transitory memory storing instructions, which instructions when executed by the processor, may cause the processor to control the propeller control unit to feather each propeller blade of the plurality of propeller blades based on the oil pressure signal.

In any of the aspects or embodiments described above and herein, the propeller control unit may further include a servo valve in fluid communication between the pump and the actuator. Each of the servo valve, the pump, the flow regulator, and the auxiliary relief valve may bound a main oil flow path of the propeller control unit. The pressure sensor may be in fluid communication with the main oil flow path. The auxiliary relief valve may be configured to control the oil pressure in the main oil flow path independent of the flow regulator.

The present disclosure, and all its aspects, embodiments and advantages associated therewith will become more readily apparent in view of the detailed description provided below, including the accompanying drawings.

DETAILED DESCRIPTION

Figure 1:
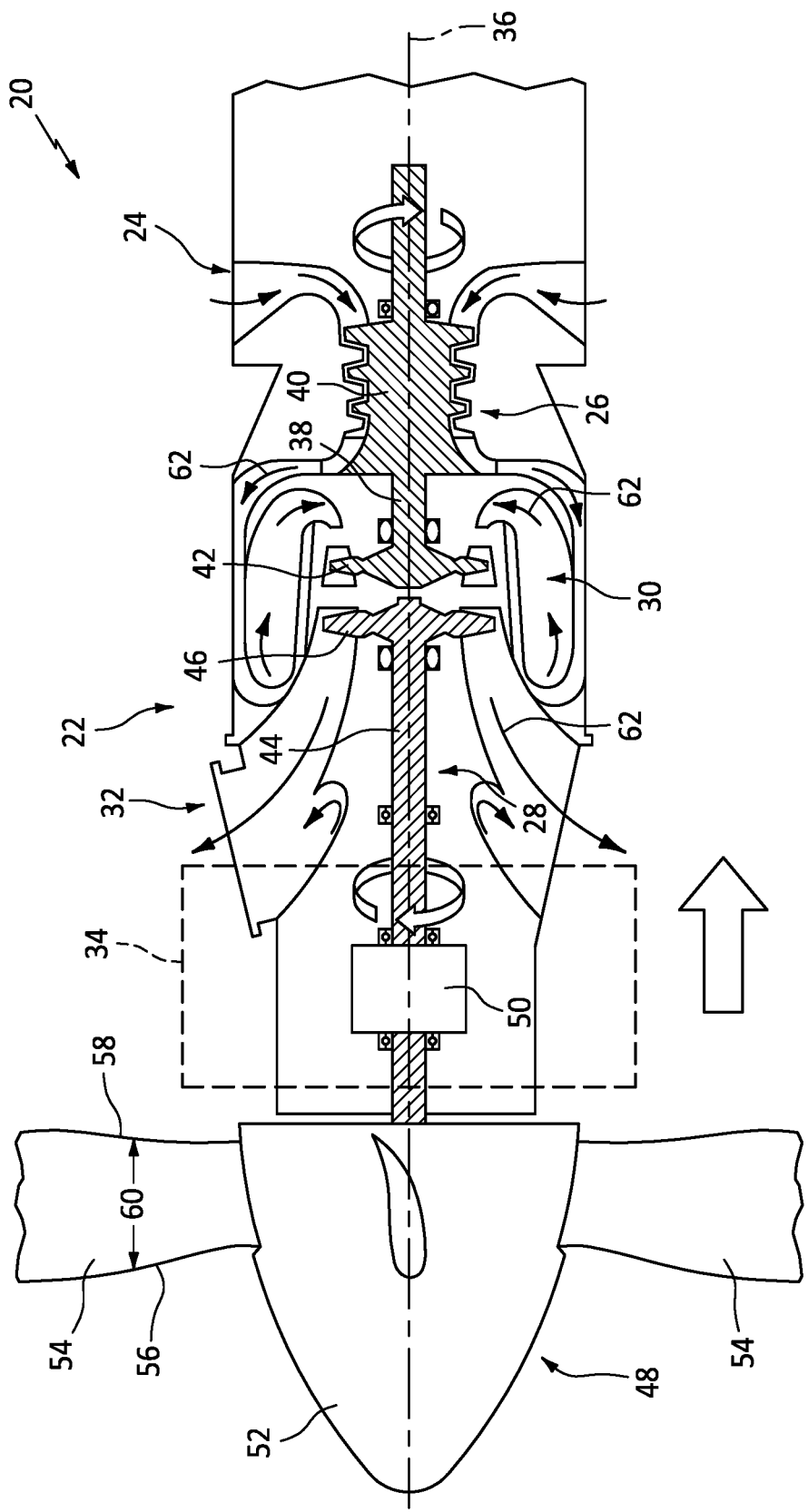
FIG. 1 illustrates a schematic, cutaway view of a propulsion system for an aircraft, in accordance with one or more embodiments of the present disclosure.

FIG. 1 illustrates a propulsion system 20 for an aircraft. The aircraft propulsion system 10 of FIG. 1 includes a gas turbine engine 22. The gas turbine engine 22 of FIG. 1 is configured as a turboprop engine. However, the present disclosure is not limited to any particular configuration of gas turbine engine for the propulsion assembly 20, and examples of gas turbine engine configurations for the propulsion system 20 may include, but are not limited to, a turbofan engine, a turbojet engine, a propfan engine, or the like. The gas turbine engine 22 of FIG. 1, for example, includes an air inlet 24, a first rotational assembly 26, a second rotational assembly 28, a combustor 30, an exhaust 32, and an oil system 34.

The first rotational assembly 26 and the second rotational assembly 28 are mounted for rotation about an axial centerline 36 (e.g., a rotational axis) of the gas turbine engine 22. The first rotational assembly 26 includes a first shaft 38, a bladed compressor rotor 40, and a bladed first turbine rotor 42. The first shaft 38 interconnects the bladed compressor rotor 40 and the bladed first turbine rotor 42. The second rotational assembly 28 includes a second shaft 44, a bladed second turbine rotor 46, and a propeller 48. The second shaft 44 interconnects the bladed second turbine rotor 46 and the propeller 48. The propeller 48 of FIG. 1 is connected to the second shaft 44 by a speed-reducing gear assembly 50 to drive the propeller 48 at a reduced rotational speed relative to the second shaft 44. Alternatively, the second shaft 44 may directly interconnect the propeller 48 with the bladed second turbine rotor 46.

The propeller 48 of FIG. 1 is configured for rotation about the axial centerline 36. The propeller 48 of FIG. 1 includes a hub 52 and a plurality of propeller blades 54. The propeller blades 54 are mounted to the hub 52. The propeller blades 54 are circumferentially distributed about the hub 52 relative to the axial centerline 36. However, it should be understood that the propeller 48 may be configured for rotation about a rotational axis which is different than the axial centerline 36 and, therefore, the propeller blades 54 may be circumferentially distributed about this different rotational axis. Each propeller blade 54 includes a leading edge 56 and a trailing edge 58. Each propeller blade 54 may be understood to have a chord 60 representing an imaginary line extending between and to the leading edge 56 and the trailing edge 58. For clarity, the chord 60 of FIG. 1 is illustrated as extending in a substantially axial direction relative to the axial centerline 36, however, the present disclosure is not limited to the chord 60 orientation illustrated in FIG. 1. As will be discussed in further detail, the propeller blades 54 may be configured as variable-pitch propeller blades 54.

During operation of the propulsion system 20 of FIG. 1, ambient air enters the propulsion system 20 through the air inlet 24 and is directed into a core flow path 62 through the gas turbine engine 22. The ambient air is compressed by the bladed compressor rotor 40 (e.g., a compressor) and directed into a combustion chamber of the combustor 30. Fuel is injected into the combustion chamber and mixed with the compressed air to provide a fuel-air mixture. This fuel-air mixture is ignited and combustion products thereof, which may be referred to as "combustion gas," flow through and sequentially cause the bladed first turbine rotor 42 and the bladed second turbine rotor 46 to rotate. The rotation of the bladed first turbine rotor 42 and the bladed second turbine rotor 46 respectively drive rotation of the first rotational assembly 26 and the second rotational assembly 28. Rotation of the second rotational assembly 28 further drives rotation of the propeller 48 to provide propulsion (e.g., thrust) for an associated aircraft. The combustion gas is directed out of the gas turbine engine 22 through the exhaust 32.

Figure 2:
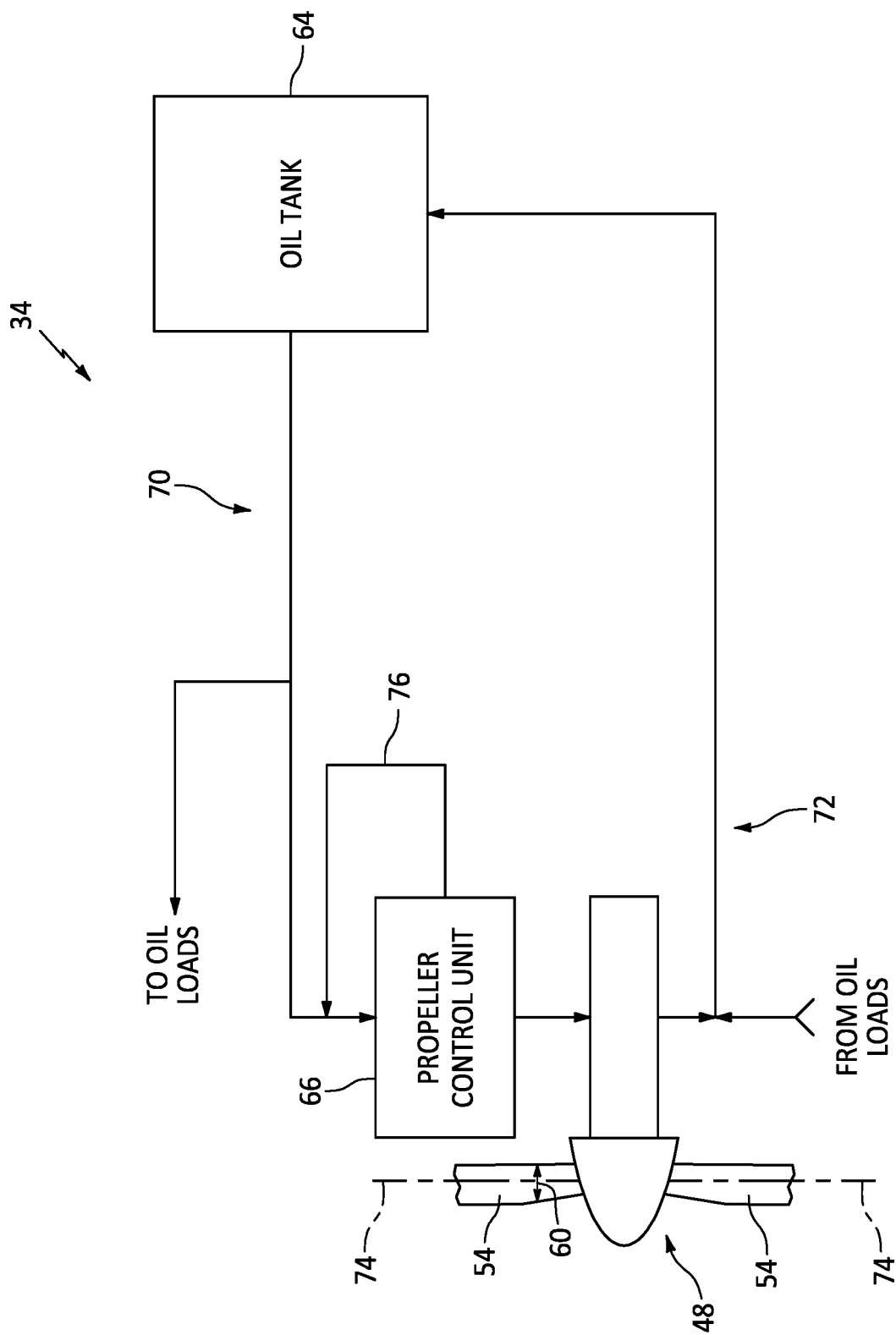
FIG. 2 illustrates a schematic view of an exemplary oil system for the propulsion system of FIG. 1, in accordance with one or more embodiments of the present disclosure.

Referring to FIG. 2, an exemplary embodiment of the oil system 34 is schematically illustrated. The oil system 34 is configured to provide lubrication for rotational components of the gas turbine engine 22 such as, but not limited to, bearings, shafts, gears and/or gear assemblies, and the like. The oil system 34 of FIG. 2 includes an oil tank 64 and a propeller control unit 66. However, an oil system of the present disclosure, such as the oil system 34, may include more, fewer, or different components to provide lubrication, cooling, and/or other functions for the gas turbine engine 22.

The oil system 34 forms an oil supply assembly 70 and an oil return assembly 72. Each of the oil supply assembly 70 and the oil return assembly 72 include fluid lines (e.g., conduits, pipes, hoses, etc.), connectors, valves, pumps, filters, heat exchangers, and other components to convey oil to and from components of the oil system 34 such as, but not limited to, the oil tank 64 and the propeller control unit 66. The present disclosure, however, is not limited to any particular configuration of the oil system 34. The oil tank 64 is configured to store and serve as a source of oil for the oil system 34. The oil system 34 may include a plurality of oil tanks of which the oil tank 64 may be configured as a main oil tank or an auxiliary oil tank. Oil from the oil tank 64 of FIG. 2 is directed to the propeller control unit 66 and other oil loads by the oil supply assembly 70. Scavenged oil from the propeller control unit 66 and other oil loads may be directed to the oil tank 64 by the oil return assembly 72. For example, the oil return assembly 72 may include a scavenge pump (not shown) to pressurize and direct the scavenged oil to the oil tank 64 and/or to other components of the oil system 34.

The propeller control unit 66 is configured to vary a pitch of each propeller blade 54 by effecting and controlling rotation of each propeller blade 54 about a lengthwise axis 74 of each respective propeller blade 54. The pitch of each propeller blade 54 may be understood, for example, as an angle between the chord 60 and a rotational plane of the propeller 48 (e.g., a plane which is perpendicular to a rotational axis of the propeller 48). The propeller control unit 66 of FIG. 2 uses and modulates oil (e.g., oil flow, oil pressure, etc.) provided by the oil system 34 to control (e.g., hydraulically control) the pitch of the propeller blades 54. It should be understood, however, that the propeller control unit 66 of the present disclosure is not limited to the use of any particular hydraulic fluid (e.g., oil). The propeller control unit 66 is additionally configured to divert excess oil from the propeller control unit 66 along a leakage flow path 76 formed by fluid lines (e.g., conduits, pipes, hoses, etc.), connectors, valves, and the like. The leakage flow path 76 may be configured to direct oil from the propeller control unit 66 to the oil supply assembly 70 (e.g., to an inlet of the propeller control unit 66). Alternatively, the leakage flow path 76 may be configured to direct oil from the propeller control unit 66 to the oil return assembly 72. The present disclosure will be described with respect to the propeller control unit 66 and the configuration of the propeller control unit 66 for controlling propeller blade 54 pitch. However, aspects of the present disclosure may also be relevant to hydraulic control systems other than propeller control units as well as propeller control units having alternatively configurations such as, but not limited to, propeller speed governing control units.

Figure 3:
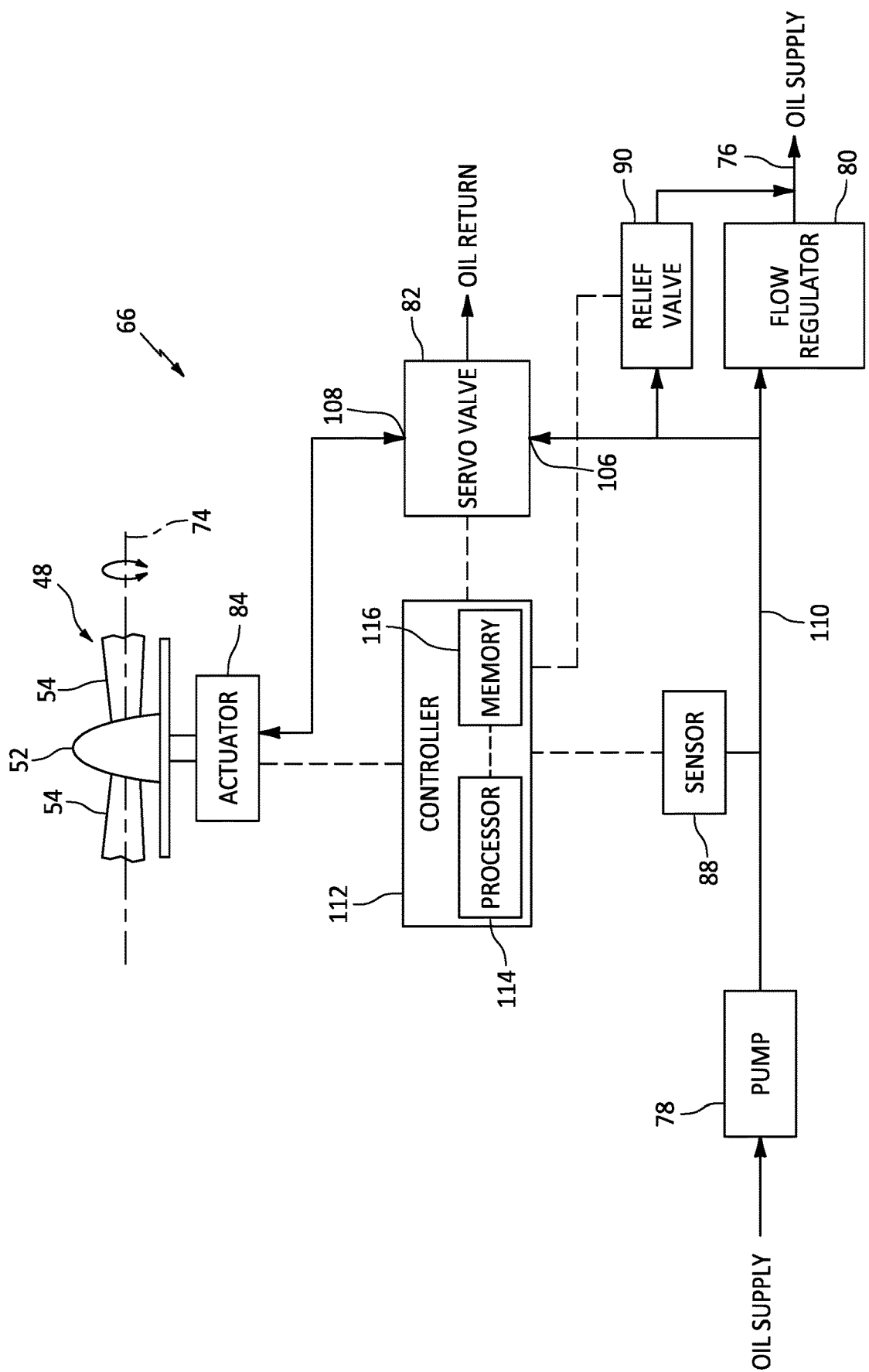
FIG. 3 illustrates a schematic view of a propeller control unit for the oil system of FIG. 2, in accordance with one or more embodiments of the present disclosure.

Referring to FIG. 3, an exemplary embodiment of the propeller control unit 66 is schematically illustrated. The propeller control unit 66 of FIG. 3 includes a pump 78, a flow regulator 80, a servo valve 82, a blade actuator 84, a pressure sensor 88, and an auxiliary relief valve 90.

The pump 78 of FIG. 3 is configured to draw oil from the oil supply assembly 70 (see FIG. 2) and pressurize and direct the oil to components of the propeller control unit 66, thereby providing hydraulic power for control of the pitch for each propeller blade 54. For example, the pump 78 is configured to direct the oil, directly or indirectly, to the blade actuator 84. The pump 78 may be configured, for example, as a fixed displacement pump to provide a substantially constant flow rate of oil to the components of the propeller control unit 66 to provide a dedicated source of constant hydraulic power for the propeller control unit 66.

The flow regulator 80 is disposed downstream of the pump 78 within the propeller control unit 66. The flow regulator 80 is in fluid communication with the leakage flow path 76. The flow regulator 80 is configured to direct oil flow from the pump 78 to the leakage flow path 76 or to block the flow of oil from the pump 78 to the leakage flow path 76. For example, the flow regulator 80 may be configured to control oil pressure downstream of the pump 78 and within the propeller control unit 66 by directing excess oil from the pump 78 into the leakage flow path 76 and, subsequently, into the oil return assembly 72 (see FIG. 2). The term "excess oil" may be used to refer to oil which is supplied by the pump 78 but which is not required by the propeller control unit 66 for control of propeller blade 54 pitch. Excess oil may be supplied by the pump 78, for example, during steady state conditions of the propulsion system 20 (e.g., cruise, flight idle, ground idle, etc.) and the propeller control unit 66 in which there is no need to change the pitch of the propeller blades 54. Accordingly, the flow regulator 80 may control the oil pressure of the oil supplied to the servo valve 82 by the pump 78 to maintain the oil pressure within an optimal pressure range for facilitating accurate operation of the servo valve 82. An oil pressure of the oil supplied to the servo valve 82 which becomes too high may prevent the servo valve 82 from operating as expected, thereby leading to various instances of failure of the propeller control unit 66.

Figure 4:
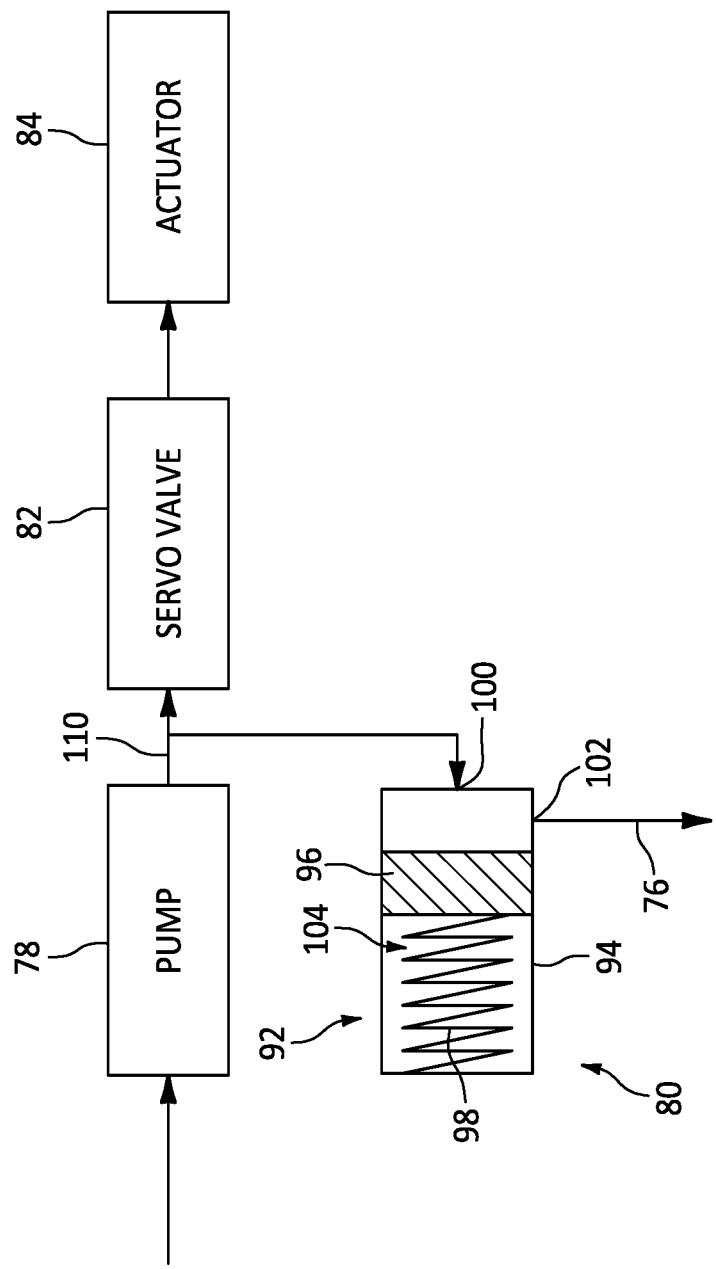
FIG. 4 illustrates a schematic view of a flow regulator for the propeller control unit of FIG. 3, in accordance with one or more embodiments of the present disclosure.
Figure 5:
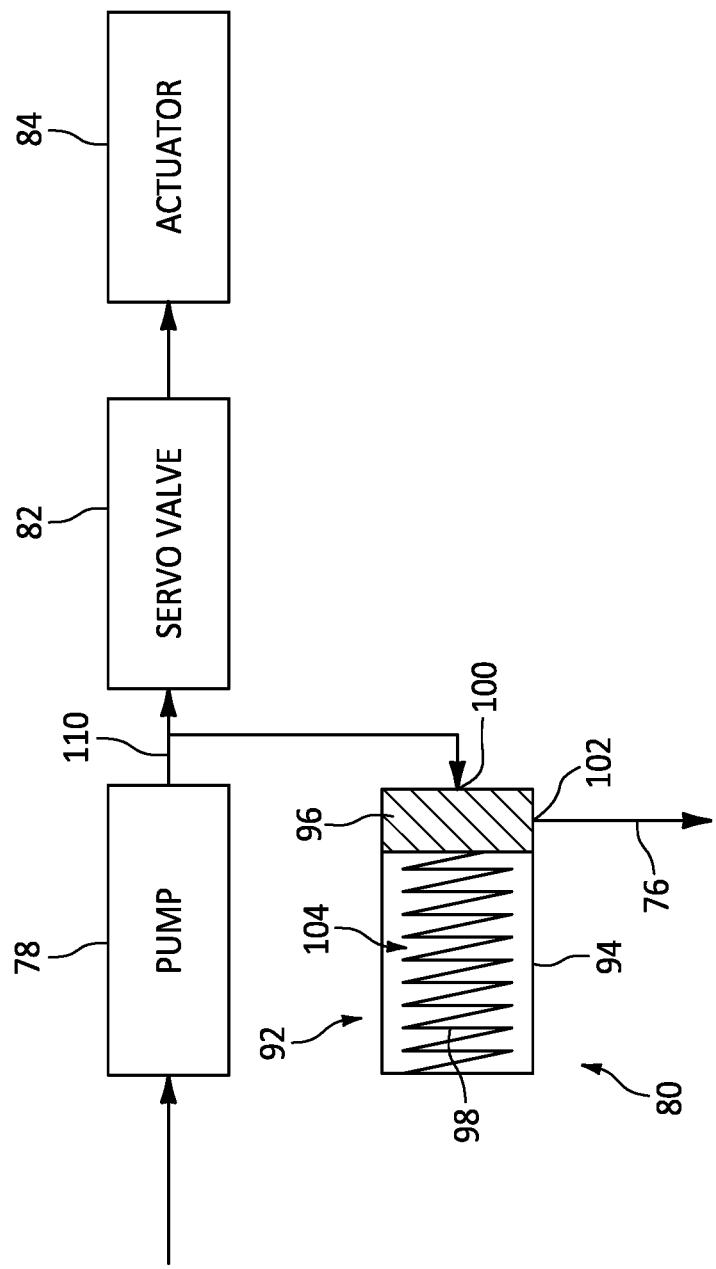
FIG. 5 illustrates another schematic view of the flow regulator for the propeller control unit of FIG. 3, in accordance with one or more embodiments of the present disclosure.

The flow regulator 80 may include a pressure regulator valve (PRV) 92. FIG. 4 illustrates a schematic view of the PRV 92 in an open condition. FIG. 5 illustrates a schematic view of the PRV 92 in a closed condition. The PRV 92 of FIGS. 4 and 5 is configured as a spring-biased pressure relief valve. The PRV 92 of FIGS. 4 and 5 includes a housing 94, a plug 96, and a spring 98. The housing 94 forms an inlet aperture 100, an outlet aperture 102, and an internal chamber 104. The inlet aperture 100 is in fluid communication with an outlet of the pump 78 and the internal chamber 104. The outlet aperture 102 is in fluid communication with the leakage flow path 76 and the internal chamber 104. The plug 96 is disposed within the internal chamber 104. The plug 96 is configured to slide within and along the housing 94 between and to an open position (see FIG. 4) and a closed position (see FIG. 5). In the closed position, the plug 96 may block or otherwise obstruct a flow of oil from the inlet aperture 100 to the outlet aperture 102 through the internal chamber 104. In the open position, the plug 96 may allow a flow of oil from the inlet aperture 100 to the outlet aperture 102 and, subsequently, into the leakage flow path 76. The spring 98 is positioned within the internal chamber 104 between the housing 94 and the plug 96. The spring 98 is configured to bias the plug 96 in the closed position. The PRV 92 may, therefore, control the oil pressure downstream of the pump 78 by selectively directing (e.g., blocking oil flow through the PRV 92, allowing some oil flow from the pump 78 through the PRV 92, or allowing all oil flow from the pump 78 through the PRV 92, etc.) the oil into the leakage flow path 76. It should be understood, however, that the present disclosure is not limited to the exemplary PRV 92 configuration of FIGS. 4 and 5.

During steady state conditions of the propeller control unit 66, the force applied by the pressurized oil at the inlet aperture 100 may be greater than the biasing force of the spring 98. In this condition, the plug 96 may be moved away from the inlet aperture 100 and the outlet aperture 102 (e.g., the open position) allowing oil to flow from the inlet aperture 100 to the outlet aperture 102. During transient conditions of the propulsion system 20 (e.g., takeoff, climb, acceleration, descent, etc.) and the propeller control unit 66, such as when the propeller control unit 66 may effect rotation of the propeller blades 54 to control the propeller blade 54 pitch, the force applied by the pressurized oil at the inlet aperture 100 may be less than the biasing force of the spring 98. In this condition, the plug 96 may be biased in the closed position to block the inlet aperture 100 and/or the outlet aperture 102 preventing oil to flow from the inlet aperture 100 to the outlet aperture 102.

The servo valve 82 is disposed downstream of the pump 78 and the flow regulator 80 within the propeller control unit 66. The servo valve 82 includes an inlet 106 and an outlet 108. The inlet 106 is in fluid communication with the pump 78. The outlet 108 is in fluid communication with the blade actuator 84. The servo valve 82, therefore is disposed in fluid communication between (e.g., fluidly separating) the pump 78 and the blade actuator 84. The servo valve 82 is configured to control a pressure and/or a flow rate of the oil supplied to the blade actuator 84 from the outlet 108. The servo valve 82 is additionally configured to direct oil from the blade actuator 84 (e.g., to the oil return assembly 72, see FIG. 2). The servo valve 82 may be configured, for example, as an electro-hydraulic servo valve (EHSV). The servo valve 82, configured as an EHSV, may control the pressure of the oil supplied to the blade actuator 84 based on an electrical signal (e.g., a control current applied to a solenoid of the servo valve 82) received by the servo valve 82. The present disclosure, however, is not limited to any particular configuration of the servo valve 82.

The blade actuator 84 is disposed downstream of the servo valve 82. The blade actuator 84 is configured to effect rotation of each propeller blade 54 about its respective lengthwise axis 74 in order to control the pitch of the respective propeller blade 54. The blade actuator 84 is configured to convert the hydraulic force of the oil supplied to the blade actuator 84 by the servo valve 82 to rotational motion of the propeller blades 54. The blade actuator 84 may effect fine and coarse changes in propeller blade 54 pitch. The present disclosure is not limited to any particular configuration of the blade actuator 84 for controlling propeller blade 54 pitch using the oil supplied to the blade actuator 84.

The pressure sensor 88 of FIG. 3 is in fluid communication with the outlet of the pump 78. The pressure sensor 88 of FIG. 3 is disposed downstream of the pump 78 and upstream of the blade actuator 84. For example, the pressure sensor 88 of FIG. 3 is disposed in fluid communication with a main oil flow path 110 of the propeller control unit 66. The main oil flow path 110 of FIG. 3 may be understood as the oil line (e.g., conduits, pipes, hoses, etc.) extending between and bounded by the pump 78, the flow regulator 80, the servo valve 82, and the auxiliary relief valve 90. The pressure sensor 88 may, therefore, be configured to measure a pressure of the oil within the main oil flow path 110. The pressure sensor 88 is configured, for example, as a transducer to generate an oil pressure signal representative of the measured pressure of the oil.

The auxiliary relief valve 90 is in fluid communication with the outlet of the pump 78. For example, the auxiliary relief valve 90 of FIG. 3 is in fluid communication with the main oil flow path 110 downstream of the flow regulator 80. The auxiliary relief valve 90 may be configured as a solenoid valve or other remotely actuated valve. For example, the auxiliary relief valve 90 may be controlled remotely using an electric signal. The auxiliary relief valve 90 of FIG. 3 is configured to direct oil flow from the pump 78 to the leakage flow path 76 (e.g., in an open position) or to block the flow of oil from the pump 78 to the leakage flow path 76 (e.g., in a closed position). For example, the auxiliary relief valve 90 may be repositioned from the closed position (e.g., a default position) to an open position to reduce the oil pressure of the oil within the main oil flow path 110, for example, due to a failure of the flow regulator 80 (e.g., the PRV 92 stuck in the closed condition) to operate to direct oil from the main oil flow path 110 to the leakage flow path 76 or to otherwise suitably regulate oil flow from the pump 78.

In some embodiments, the propulsion system 20 and/or its propeller control unit 66 may include a controller 112. The controller 112 may be in communication (e.g., wired and/or wireless signal communication) with the blade actuator 84, the pressure sensor 88, the auxiliary relief valve 90, and/or other components or sensors of the propeller control unit 66. The controller 112 may be configured to apply a control current to the servo valve 82 to control operation of the servo valve 82. The controller 112 of FIG. 3 includes a processor 114 and memory 116. The memory 116 is in signal communication with the processor 114. The processor 114 may include any type of computing device, computational circuit, or any type of process or processing circuit capable of executing a series of instructions that are stored in the memory 116, thereby causing the processor 114 to perform or control one or more steps or other processes. The processor 114 may include multiple processors and/or multicore processors and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 116 may represent one or more algorithms for controlling aspects of the propulsion system 20 and/or the propeller control unit 66, and the stored instructions are not limited to any particular form (e.g., program files, system data, buffers, drivers, utilities, system programs, etc.) provided they can be executed by the processor 114. The memory 116 may be a non-transitory computer readable storage medium configured to store instructions that when executed by one or more processors, cause the one or more processors to perform or cause the performance of certain functions. The memory 116 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 112 may be achieved via the use of hardware, software, firmware, or any combination thereof. The controller 112 may also include input and output devices (e.g., keyboards, buttons, switches, touch screens, video monitors, sensor readouts, data ports, etc.) that enable the operator to input instructions, receive data, etc. The controller 112 may be located within the propulsion system 20 or may alternatively be located on an aircraft on which the propulsion system 20 is installed.

The controller 112 may form or otherwise be part of an electronic engine controller (EEC) for the propulsion system 20. The EEC may control operating parameters of the gas turbine engine 22 including, but not limited to, fuel flow, stator vane position (e.g., variable compressor inlet guide vane (IGV) position), compressor air bleed valve position, propeller 48 speed, propeller blade 54 pitch, etc. so as to control an engine power and/or thrust of the gas turbine engine 22. In some embodiments, the EEC may be part of a full authority digital engine control (FADEC) system for the propulsion system 20.

Figure 6:
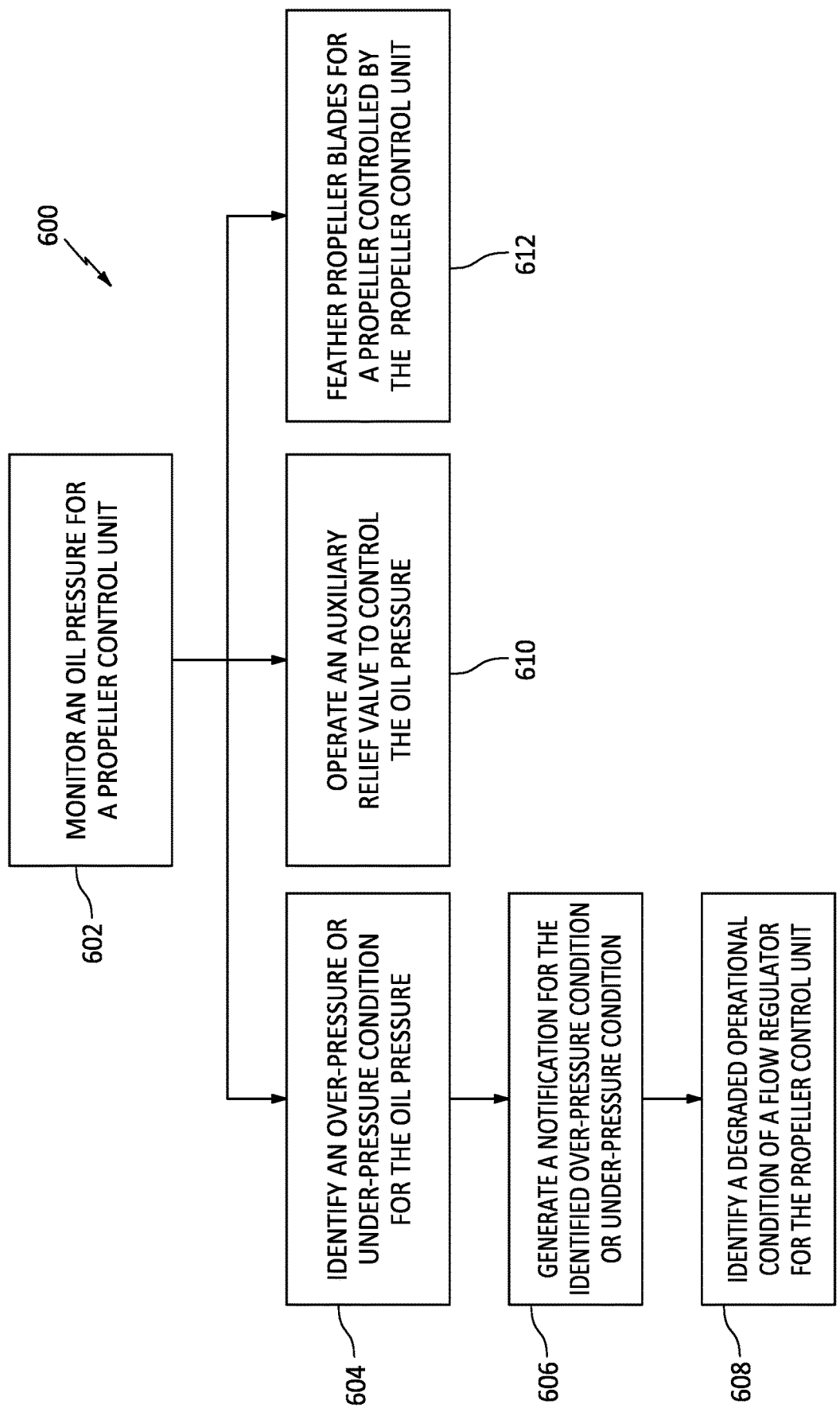
FIG. 6 illustrates a block diagram of a method for controlling propeller control unit fluid pressure, in accordance with one or more embodiments of the present disclosure.

Referring to FIGS. 3 and 6, a Method 600 for controlling propeller control unit hydraulic fluid (e.g., oil) pressure is provided. FIG. 6 illustrates a flowchart for the Method 600. The Method 600 may be performed for the propulsion system 20 and its propeller control unit 66, as described herein. The controller 112 may be used to execute or control one or more steps of the Method 600. For example, the processor 114 may execute instructions stored in memory 116, thereby causing the controller 112 and/or its processor 114 to execute or otherwise control one or more steps of the Method 600. However, while the Method 600 may be described herein with respect to the propulsion system 20, the propeller control unit 66, and the controller 112, the present disclosure Method 600 is not limited to use with the propulsion system 20, the propeller control unit 66, and the controller 112 described herein. Unless otherwise noted herein, it should be understood that the steps of Method 600 are not required to be performed in the specific sequence in which they are discussed below and, in some embodiments, the steps of Method 600 may be performed separately or simultaneously.

Step 602 includes monitoring a pressure of the oil (e.g., the oil pressure signal from the pressure sensor 88) in the main oil flow path 110. During operation of the propulsion system 20 and its propeller control unit 66, the pump 78 may operate (e.g., continuously operate) to supply pressurized oil to the servo valve 82 along the main oil flow path 110. The flow regulator 80 may operate to control pressure of the oil within the main flow path 110, as described above. The pressure sensor 88 may measure a pressure of the oil in the main oil flow path 110 and provide an oil pressure signal to the controller 112. The controller 112 may compare the measured oil pressure (e.g., the oil pressure signal) to an oil pressure range (e.g., a pressure range between a minimum pressure and a maximum pressure). The pressure range may represent an expected (e.g., predetermined) pressure range for the oil within the main oil flow path 110, which expected pressure range may correspond to an optimal pressure range for operation of the servo valve 82, as previously discussed.

Step 604 may include identifying (e.g., with the controller 112) that an over-pressure condition or an under-pressure condition is present or absent for the oil within the main oil flow path 110. The controller 112 may identify an over-pressure condition based on a measured pressure from the pressure sensor 88 increasing to or above a maximum pressure of the expected pressure range. Similarly, the controller 112 may identify an under-pressure condition based on a measured pressure from the pressure sensor 88 decreasing to or below a minimum pressure of the expected pressure range.

Step 606 may include generating a notification (e.g., a warning message, a warning light, an audible alarm, etc.) for a pilot, technician, or other operator of the propulsion system 20, in response to an identified over-pressure condition or an under-pressure condition, the controller 112 may generate. The identification of an over-pressure condition or an under-pressure condition may indicate that the flow regulator 80 is not properly regulating the pressure of the oil within the main oil flow path 110 and/or that the flow regulator 80 is responding slowly to pressure transients within the main oil flow path 110.

Step 608 may include identifying (e.g., with the controller 112) a degraded operational condition of the flow regulator 80. For example, the controller 112 may identify a degraded operational condition of the flow regulator 80 based on one or more occurrences of an identified over-pressure condition and/or an identified under-pressure condition. The controller 112 may additionally or alternatively identify a degraded operational condition of the flow regulator 80 based on a time threshold. For example, the controller 112 may identify a degraded operational condition of the flow regulator 80 based on an identified over-pressure condition or under-pressure condition which occurs (e.g., occurs continuously) for an amount of time exceeding the time threshold. In response to an identified degraded operational condition of the flow regulator 80, the controller 112 may generate notification (e.g., a warning message, a warning light, an audible alarm, etc.) for a pilot, technician, or other operator of the propulsion system 20. The generated notification may identify a corrective action such as, but not limited to maintenance or replacement of the flow regulator 80.

Step 610 may include operating (e.g., selectively operating) the auxiliary relief valve 90 to control a pressure of the oil within the main oil flow path 110. For example, the controller 112 may control the auxiliary relief valve 90 to open based on the measured pressure from the pressure sensor 88 increasing to or above a first pressure threshold. The open auxiliary relief valve 90 may direct oil from the main oil flow path 110 to the leakage flow path 76 to reduce the pressure of the oil within the main oil flow path 110 and to maintain the pressure of the oil within a pressure range (e.g., the expected pressure range) which is suitable for operation of the servo valve 82. The first pressure threshold may be less than, equal to, or greater than the maximum pressure of the expected pressure range. The controller 112 may control the auxiliary relief valve 90 to shut based on the measured pressure from the pressure sensor 88 decreasing to or below a second pressure threshold, which second pressure threshold is less than the first pressure threshold.

Step 612 may include feathering the propeller blades 54 (e.g., during a flight condition of the propulsion system 20). For example, the controller 112 may control the propeller control unit 66 to feather each of the propeller blades 54 for the propeller 48. Feathering the propeller blades 54 may include rotating or otherwise positioning each of the propeller blades 54, using the propeller control unit 66, so that the chord 60 of each propeller blade 54 extends parallel to or substantially parallel to a direction of the incoming ambient air (e.g., an axial direction relative to the axial centerline 36). Feathering of the propeller blades 54 may be accomplished in a number of ways such as, for example, by controlling the auxiliary relief valve 90 to direct all or substantially all of the oil from the main oil flow path 110 to the leakage flow path 76, by controlling the servo valve 82 to direct oil away from the blade actuator 84 (e.g., reduce oil pressure supplied to the blade actuator 84 to near zero), or by controlling a dedicated feathering valve assembly (not shown) to direct oil away from the blade actuator 84. The present disclosure propeller control unit 66 is not limited to any particular configuration for feathering the propeller blades 54. The controller 112 may control the propeller control unit 66 to feather the propeller blades 54 based on the measured pressure from the pressure sensor 88 increasing to or above a third pressure threshold.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A propeller control unit for an aircraft propulsion system including a propeller, the propeller control unit comprising:
    an actuator configured to rotate propeller blades of the propeller to control a pitch of each of the propeller blades;
    a pump configured to direct hydraulic fluid to the actuator;
    a flow regulator in fluid communication with the pump, the flow regulator configured to control a hydraulic fluid pressure of the hydraulic fluid downstream of the pump;
    an auxiliary relief valve and a servo valve, the auxiliary relief valve and the servo valve in fluid communication with the pump;
    a pressure sensor in fluid communication with the pump, the pressure sensor disposed downstream of the pump, the pressure sensor disposed upstream of the actuator and the flow regulator, and the pressure sensor configured to measure the hydraulic fluid pressure and generate a hydraulic fluid pressure signal; and
    a controller in signal communication with the pressure sensor, the controller including a processor and a non-transitory memory storing instructions, the processor connected in communication with the non-transitory memory, the instructions when executed by the processor, cause the processor to:
        monitor the hydraulic fluid pressure signal from the pressure sensor;
        identify an over-pressure condition is present or absent based on a pressure range for the hydraulic fluid pressure signal;
        identify an under-pressure condition is present or absent based on the pressure range for the hydraulic fluid pressure signal;
        identify a degraded operational condition of the flow regulator based on identification of the over-pressure condition or the under-pressure condition of the hydraulic fluid pressure signal which occurs for an amount of time exceeding a time threshold; and
        open the auxiliary relief valve when the hydraulic fluid pressure signal exceeds a hydraulic fluid pressure threshold;
    wherein each of the servo valve, the pump, the flow regulator, and the auxiliary relief valve bound a main hydraulic fluid flow path of the propeller control unit, the pressure sensor in fluid communication with the main hydraulic fluid flow path, the auxiliary relief valve configured to control the hydraulic fluid pressure in the main hydraulic fluid flow path independent of the flow regulator.

2. The propeller control unit of claim 1, wherein the hydraulic fluid is oil.

3. The propeller control unit of claim 1, wherein the instructions, when executed by the processor, further cause the processor to:
generate a notification based on identification the over-pressure condition or the under-pressure condition is present.

4. The propeller control unit of claim 1, wherein the flow regulator includes a spring-biased pressure relief valve.

5. The propeller control unit of claim 1, wherein each of the auxiliary relief valve and the flow regulator are configured to direct the hydraulic fluid from the main hydraulic fluid flow path to an inlet of the pump.

6. A propeller control unit for an aircraft propulsion system including a propeller, the propeller control unit comprising:
an actuator configured to rotate propeller blades of the propeller to control a pitch of each of the propeller blades;
a pump configured to direct hydraulic fluid to the actuator;
a flow regulator in fluid communication with the pump, the flow regulator configured to control a hydraulic fluid pressure of the hydraulic fluid downstream of the pump;
an auxiliary relief valve in fluid communication with the pump;
a servo valve in fluid communication with the pump;
a pressure sensor in fluid communication with the pump, the pressure sensor disposed downstream of the pump, the pressure sensor disposed upstream of the actuator and the flow regulator, and the pressure sensor configured to measure the hydraulic fluid pressure and generate a hydraulic fluid pressure signal; and
a controller in signal communication with the pressure sensor, the controller including a processor and a non-transitory memory storing instructions, the processor connected in communication with the non-transitory memory, the instructions when executed by the processor, cause the processor to:
monitor the hydraulic fluid pressure signal from the pressure sensor;
identify a degraded operational condition of the flow regulator based on identification of an over-pressure condition or an under-pressure condition of the hydraulic fluid pressure signal which occurs for an amount of time exceeding a time threshold; and
open the auxiliary relief valve when the hydraulic fluid pressure signal exceeds a hydraulic fluid pressure threshold;
wherein each of the servo valve, the pump, the flow regulator, and the auxiliary relief valve bound a main hydraulic fluid flow path of the propeller control unit, the pressure sensor in fluid communication with the main hydraulic fluid flow path, the auxiliary relief valve configured to control the hydraulic fluid pressure in the main hydraulic fluid flow path independent of the flow regulator.

* * * * *